US012069102B2

(12) United States Patent
Warburton et al.

(10) Patent No.: US 12,069,102 B2
(45) Date of Patent: Aug. 20, 2024

(54) SECURITY POLICY ENFORCEMENT AND VISIBILITY FOR NETWORK TRAFFIC WITH MASKED SOURCE ADDRESSES

(71) Applicant: Palo Alto Networks, Inc., Santa Clara, CA (US)

(72) Inventors: Thomas Arthur Warburton, San Jose, CA (US); Ashwath Sreenivasa Murthy, San Francisco, CA (US); Jeffrey James Fitz-Gerald, Jr., Campbell, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 4 days.

(21) Appl. No.: 17/646,857

(22) Filed: Jan. 3, 2022

(65) Prior Publication Data
US 2022/0131906 A1 Apr. 28, 2022

Related U.S. Application Data

(63) Continuation of application No. 16/399,783, filed on Apr. 30, 2019, now Pat. No. 11,218,512.

(51) Int. Cl.
*H04L 9/40* (2022.01)
*H04L 47/20* (2022.01)
*H04L 67/52* (2022.01)

(52) U.S. Cl.
CPC ............ *H04L 63/205* (2013.01); *H04L 47/20* (2013.01); *H04L 63/0236* (2013.01); *H04L 67/52* (2022.05)

(58) Field of Classification Search
CPC ....... H04L 63/205; H04L 67/52; H04L 47/20; H04L 63/0236
See application file for complete search history.

(56) References Cited

U.S. PATENT DOCUMENTS

| 7,496,662 B1 | 2/2009 | Roesch et al. |
| 7,885,190 B1 | 2/2011 | Roesch et al. |

(Continued)

FOREIGN PATENT DOCUMENTS

CN 108683632 A * 10/2018

OTHER PUBLICATIONS

PCT Application Serial No. PCT/US2020/030313, International Search Report, mailed Jul. 16, 2020, 4 pages.

(Continued)

*Primary Examiner* — Alexander Lagor
*Assistant Examiner* — Saad Ahmad Abdullah
(74) *Attorney, Agent, or Firm* — Gilliam IP PLLC (57) ABSTRACT

Some network architectures include perimeter or edge devices which perform network address translation or otherwise modify data in a network traffic packet header, such as the source address. The modification of the source address prevents downstream devices from knowing the true or original source address from which the traffic originated. To address this issue, perimeter devices can insert the original source address in an X-Forwarded-For field of the packet header. Firewalls and related security services can be programmed to record the original source address in the XFF field in addition to the other packet information and to consider the original source address during security analysis. Using the original source address in the XFF field, services can determine additional characteristics about the traffic, such as geographic origin or associated user accounts, and use these characteristics to identify applicable rules or policies.

14 Claims, 4 Drawing Sheets

(56) References Cited

U.S. PATENT DOCUMENTS

| | | | |
|---|---|---|---|
| 8,218,540 | B1 | 7/2012 | Busch et al. |
| 8,789,135 | B1* | 7/2014 | Pani .................. H04L 63/0209 726/13 |
| 9,264,509 | B1 | 2/2016 | Zhou et al. |
| 9,276,851 | B1 | 3/2016 | Dror et al. |
| 9,537,891 | B1 | 1/2017 | Walter et al. |
| 9,619,608 | B1* | 4/2017 | Bernard .................. G06F 30/39 |
| 9,807,006 | B1 | 10/2017 | Stark et al. |
| 10,104,121 | B2 | 10/2018 | Xie et al. |
| 10,212,089 | B1 | 2/2019 | Narayanan |
| 10,686,735 | B1 | 6/2020 | Watson et al. |
| 10,826,840 | B1 | 11/2020 | Peterson et al. |
| 2005/0135359 | A1 | 6/2005 | Chang |
| 2005/0141531 | A1 | 6/2005 | Kinoshita et al. |
| 2005/0220094 | A1 | 10/2005 | Parker et al. |
| 2005/0283823 | A1 | 12/2005 | Okajo et al. |
| 2007/0053382 | A1 | 3/2007 | Bevan et al. |
| 2009/0034557 | A1 | 2/2009 | Fluhrer et al. |
| 2011/0110378 | A1 | 5/2011 | Savolainen et al. |
| 2011/0208874 | A1* | 8/2011 | Mann ..................... H04L 47/50 709/236 |
| 2012/0023217 | A1 | 1/2012 | Wakumoto |
| 2012/0117256 | A1 | 5/2012 | Waheed |
| 2016/0142310 | A1 | 5/2016 | Means |
| 2017/0244637 | A1 | 8/2017 | Singhal et al. |
| 2017/0295196 | A1 | 10/2017 | Arnell et al. |
| 2018/0048567 | A1 | 2/2018 | Ignatchenko |
| 2018/0146001 | A1* | 5/2018 | Chien .................. H04L 9/3247 |
| 2018/0176182 | A1 | 6/2018 | Raney et al. |
| 2018/0262599 | A1 | 9/2018 | Firestone |
| 2018/0309718 | A1 | 10/2018 | Zuo |
| 2018/0359811 | A1 | 12/2018 | Verzun et al. |
| 2019/0089748 | A1 | 3/2019 | Manor et al. |
| 2019/0097973 | A1* | 3/2019 | Adler .................. H04L 63/1425 |
| 2019/0141167 | A1 | 5/2019 | Nolan et al. |
| 2019/0173841 | A1 | 6/2019 | Wang et al. |
| 2019/0230125 | A1 | 7/2019 | Lee et al. |
| 2020/0036632 | A1 | 1/2020 | Kommula et al. |

OTHER PUBLICATIONS

PCT Application Serial No. PCT/US2020/030313, International Written Opinion, mailed Jul. 16, 2020, 6 pages.
"IIS and X-Forwarded-For header (XFF)", Load Balancer, 2011, 1 page.
"Inserting X-Forwarded-For header with LineRate", dev/central, Dec. 30, 2014, 1 page.
"Internet Protocol", Information Sciences Institute, RFC 791, Sep. 1981, 97 pages.
"X Forwarded For Single Header Insert", dev/central, 2015, 1 page.
"XFF project", Wikimedia, 2021, 1 page.
"X-Forwarded-For", [online] retrieved on Apr. 29, 2019 from <https://en.wikipedia.org/wiki/X-Forwarded-For>.
Al-Duwairi, et al., "Topology Based Packet Marking", IEE Xplore, Proceedings. 13th International Conference on Computer Communications and Networks (IEEE Cat. No.04EX969) Oct. 11-13, 2004, Mar. 14, 2005, 6 pages.
Bosshart, et al., "P4: Programming Protocol-Independent Packet Processors", ACM SIGCOMM Computer Communication Review vol. 44, No. 3, Jul. 2014, 9 pages.
Chandranmenon, et al., "Trading Packet Headers for Packet Processing", IEEE/ACM Transactions on Networking, vol. 4, No. 2, Apr. 1996, pp. 141-152.
Falguni, et al., "E-SPY: Detection and Prediction of Website Attacks", International Journal of Advanced Research in Computer Science; vol. 9, No. 1;, Jan.-Feb. 2018, 9 pages.
Hafiz, "A Collection of Privacy Design Patterns", ACM Digital Library, PLOP '06: Proceedings of the 2006 conference on Pattern languages of programs, Oct. 2006, Portland, OR, Oct. 21, 2006, 13 pages.
Hari, et al., "Path Switching: Reduced-State Flow Handling in SON Using Path Information", ACM, CoNEXT '15 Dec. 1-4, 2015, Heidelberg, Germany, 2015, 7 pages.
Holovaty, et al., "Web Development Done Right", Apress, The Definitive Guide to Django, Second Edition, 2009, 538 pages.
Huffaker, et al., "Visualization of the growth and topology of the N LAN R caching hierarchy", Elsevier Science B.V., Computer Networks and ISDN Systems 30, Jun. 1998, pp. 2131-2139.
Lee, "Nonblocking Copy Networks for Multicast packet Switching", IEEE Journal on Selected Areas in Communications, vol. 6, No. 9,, Dec. 1988, pp. 1455-1467.
López, et al., "Teaching high-performance service in a cluster computing course", J. Parallel Distrib. Comput. 117, 2018, pp. 138-147.
Makiou, et al., "Improving Web Application Firewalls to Detect Advanced SQL Injection Attacks", IEEE Xplore, 2014 10th International Conference on Information Assurance and Security, Nov. 28-30, 2014, Mar. 23, 2015, 6 pages.
Marty, "Cloud Application Logging for Forensics", ACM Digital Library, SAC '11: Proceedings of the 2011 ACM Symposium on Applied Computing, https://doi.org/10.1145/1982185.1982226, Mar. 21, 2011, pp. 178-185.
Mekky, et al., "Application-aware Data Plane Processing in SDN", ACM Digital Library, HotSDN '14: Proceedings of the third workshop on Hot topics in software defined networking, https://doi.org/10.1145/2620728.2620735, Aug. 22, 2014, pp. 13-19.
Monoharan, "Dynamic Content Management and Delivery for Mobile Devices", IEE Computer Society, International Conference on Mobile Ubiquitous Computing, Systems, Services and Technologies, Nov. 4-9, 2007, Dec. 12, 2007, pp. 63-68.
Petersson, et al., "Forwarded HTTP Extension", Internet Engineering Task Force, Request for Comments: 7239, retrieved on Jun. 29, 2020 from https://tools.ietf.org/pdf/rfc7239.pdf, Jun. 2014, 16 pages.
Quinn, et al., "Network Service Header (NSH)", Internet Engineering Task Force, Jan. 2018, 121 pages.
Tanachaiwiwat, et al., "Secure Locations: Routing on Trust and Isolating Compromised Sensors in Location-Aware Sensor Networks", ACM Digital Library, SenSys'03, Los Angeles, California, USA., Nov. 5, 2003, pp. 324-325.
Wan, "Where can HTTPS Connections be Broken?", International Forum for Security Research, Jan. 8, 2016, 4 pages.
Zhang, et al., "Measuring Privacy Threats in China-Wide Mobile Networks", Usenix Association, FOCI '18, 2018, 8 pages.

* cited by examiner

SECURITY POLICY ENFORCEMENT AND VISIBILITY FOR NETWORK TRAFFIC WITH MASKED SOURCE ADDRESSES

BACKGROUND

The disclosure generally relates to the field of data processing, and more particularly to network security.

A firewall is a network security device that monitors incoming and outgoing network traffic and controls whether traffic is allowed or blocked based on security policies or rules. A firewall can be hardware, software, or both. For example, a firewall can be a virtualized network function or can be a hardware device installed in a server rack.

BRIEF DESCRIPTION OF THE DRAWINGS

Aspects of the disclosure may be better understood by referencing the accompanying drawings.

DESCRIPTION

The description that follows includes example systems, methods, techniques, and program flows that embody aspects of the disclosure. However, it is understood that this disclosure may be practiced without these specific details. For instance, this disclosure refers to enhancing security provided by a firewall in illustrative examples. Aspects of this disclosure can be also applied to other network devices such as gateways, routers, or network analyzers. In other instances, well-known instruction instances, protocols, structures and techniques have not been shown in detail in order not to obfuscate the description.

Overview

Some network architectures include perimeter or edge devices, such as load balancers or application gateways, which perform network address translation or otherwise modify data in an Internet Protocol packet header, such as the source address. The modification of the source address prevents downstream devices from knowing the true or original source address from which the traffic originated. This creates security issues as downstream devices are unable to effectively apply security policies and rules to the network traffic. To address this issue, perimeter devices can insert the original source address in an X-Forwarded-For (XFF) field of the packet header. Firewalls and related security services can be programmed to record the original source address in the XFF field in addition to the other packet information and to consider the original source address during security analysis. For example, services such as dynamic policy groups, threat intelligence, policy enforcement, logging and application management, and external dynamic lists can be configured to utilize or even prefer the address in the XFF field over the address indicated in the standard source address header field. Using the original source address in the XFF field, the services can determine additional characteristics about the traffic, such as geographic location or associated user accounts, and use these characteristics to identify applicable rules or policies.

Example Illustrations

Figure 1:
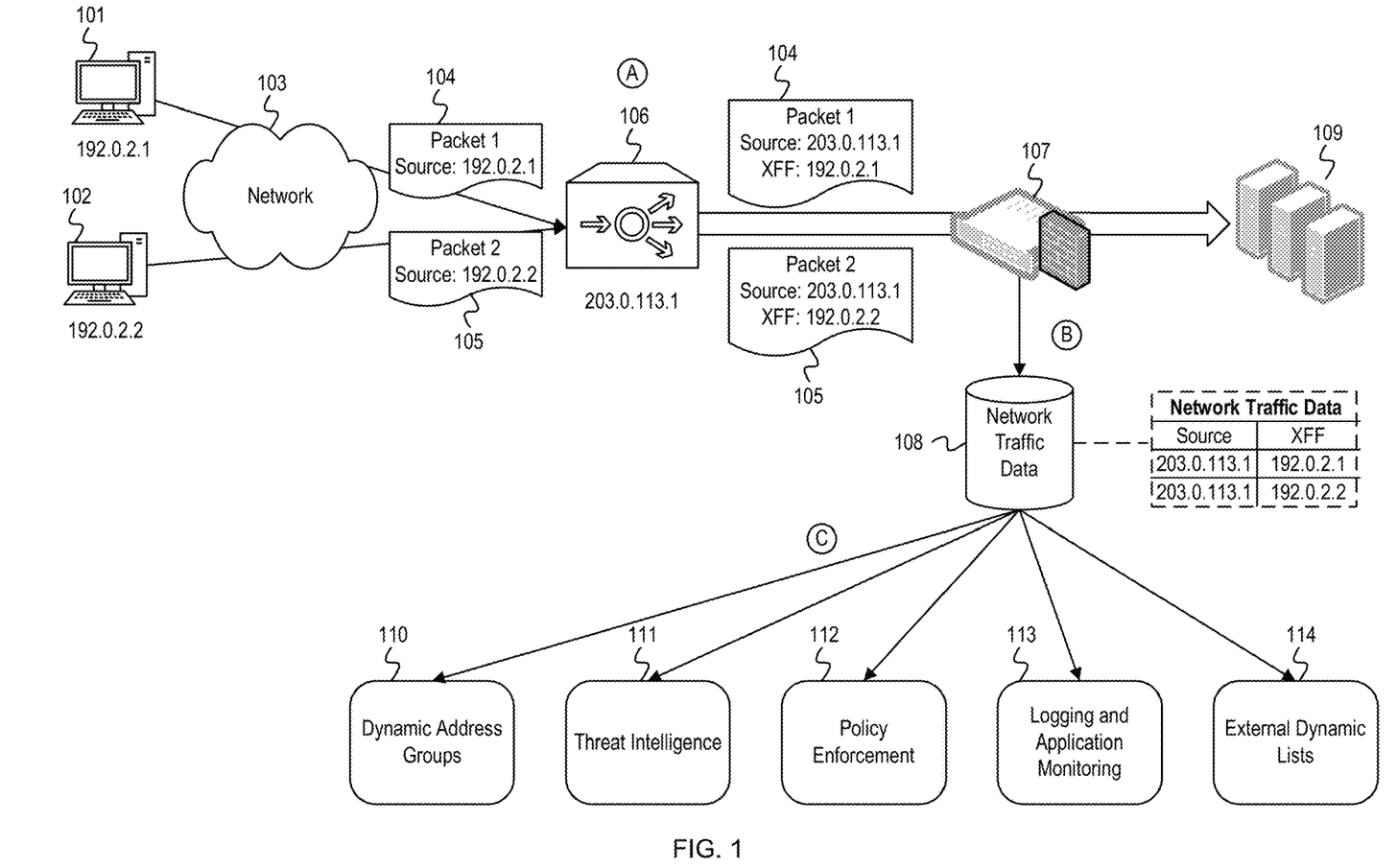
FIG. 1 depicts an example system for providing network security and performance services.

FIG. 1 depicts an example system for providing network security and performance services. FIG. 1 includes a client 1 101, a client 2 102, and a load balancer 106 which are communicatively coupled through a network 103, which may be a wide area network such as the internet or a local area network. The load balancer 106 distributes network traffic data to a firewall 107 and one or more other firewalls or devices (not depicted). FIG. 1 also includes application servers 109 which receive network traffic from the client 1 101 and the client 2 102 after traversal through the load balancer 106 and the firewall 107. The firewall 107 records data related to the network traffic in network traffic data 108 ("traffic data 108") which may be a database or other local or remote storage device. Multiple security and network administration services access and process data from the traffic data 108 including a dynamic address groups service 110, a threat intelligence service 111, a policy enforcement service 112, a logging and application monitoring service 113, and an external dynamic lists service 114. Although these services are depicted as separate from the firewall 107, the services may each be software processes that execute as part of the firewall 107, in virtual machines on the same hypervisor as the firewall 107, etc.

At stage A, the load balancer 106 processes a packet 1 104 from the client 1 101 and a packet 2 105 from the client 2 102. The packets 1 104 and 2 105 are packets which conform with the Internet Protocol (IP) suite of communication protocols. The packets 1 104 and 2 105 include a header section which indicates information related to an IP version, a source IP address, a destination IP address, time-to-live, etc. As shown in FIG. 1, as packets 1 104 and 2 105 are communicated from the clients 1 101 and 2 102 to the load balancer 106, the header of the packet 1 104 indicates an address of the client 1 101 (192.0.2.1) as the source address, and the header of the packet 2 105 indicates an address of the client 2 102 (192.0.2.2) as the source address. As part of processing the packets, the load balancer 106 performs network address translation (NAT) which modifies the sources addresses indicated in the headers of the packets 1 104 and 2 105. As shown in FIG. 1, after the packets 1 104 and 2 105 have been processed by the load balancer 106, both packets indicate the address of the load balancer 106 (203.0.113.1) as the source address in the header. The source address of the load balancer 106 is then used for routing the packets within a local network including the firewall 107 and the application servers 109. Because the source address is replaced, these devices behind the load balancer 106 lack visibility as to the true source or device which originally communicated the packets through the network 103 (i.e., the client 1 101 and the client 2 102). Other network architectures besides the architecture depicted in FIG. 1 can suffer this same issue of lack of internal visibility or masking of the true source IP address. For example, many inline network devices other than a load balancer, such as application gateways, proxies, web servers, or edge routers, may similarly perform NAT and modify the source address of IP packets.

To avoid losing the original source address information, the load balancer 106 inserts the source IP address of the originator of the packets in the XFF field of the IP packet header. After processing by the load balancer 106, the packet 1 104 includes the IP address of the client 1 101 in the XFF field of the header, and the packet 2 105 similarly includes the IP address of the client 2 102 in the XFF field. As a result, subsequent devices such as the firewall 107 which receive the packets 1 104 and 2 105 can access the XFF field of the header to identify the true source of the packet.

A stage B, the firewall 107 processes the packet 1 104 and the packet 2 105 as modified by the load balancer 106. The firewall 107 can be a software or hardware based firewall. For example, the firewall 107 may execute within a virtual machine, a container environment, or cloud infrastructure, or the firewall 107 may be a hardware device. The firewall 107 includes one or more agents or processes that are part of a packet inspection engine which records network traffic data to the traffic data 108. In some network architectures, the firewall 107 may record the source address and other data indicated in packet headers but may not record data from the XFF field, as the XFF field may not contain data or the source address field may indicate the true source address. However, when the firewall 107 is located behind a device such as the load balancer 106 which masks the original source address, the firewall 107 also records the IP address indicated in the XFF field of the header. The firewall 107 can determine that data in the XFF field should be recorded based on a parameter in a configuration file. For example, when the firewall 107 is initialized, the firewall 107 may read a bootstrapping configuration file which indicates parameters for its deployment including whether to record IP addresses from the XFF field. As shown in FIG. 1, the firewall 107 records both the source address corresponding to the load balancer 106 and the XFF field addresses corresponding to the clients 1 101 and 2 102 in the traffic data 108. The format and structure of data in the traffic data 108 may vary. For example, the traffic data 108 may be a relational database or a non-relational database. In some implementations, the traffic data 108 may not include a separate field for the XFF data. Instead, the firewall 107 may record the addresses for the clients 1 101 and 2 102 in a source address field along with the address for the load balancer 106, or the firewall 107 may not record the address for the load balancer 106 and may only record the client addresses in the source address field.

In addition to recording the packets 1 104 and 2 105, the firewall 107 can perform additional processing on the packets. The firewall 107 may perform general firewall functions of determining whether the packets should be allowed to the application servers 109 or blocked based on security rules. As described below, these rules can be formulated based not only on the source address field but also on the original address in indicated in the XFF field and other information determined based on the original address.

At stage C, security and performance services monitor and retrieve data from the traffic data 108. The services may subscribe to receive updates from an agent or process of the traffic data 108 as data is added to the traffic data 108 or may periodically retrieve new entries from the traffic data 108 for analysis. Typically, these services perform analysis based on a source address in a packet header; however, this analysis is severely limited in network architectures where the true or original source address is masked as shown in FIG. 1, as the address in the source address field will continually be the same address of the load balancer 106. As a result, these services are reconfigured to consider the address indicated in the source address field and addresses indicated in the XFF field. In general, based on the true or original source address, the services can enforce policies against the original source address, have greater visibility into clients accessing the application servers 109, selectively enforce threat prevention measures, or ascertain additional information about a client such as their geo-location.

The dynamic address groups service 110 allows for the creation of policies that automatically adapt to changes—adds, moves, or deletions of servers or devices—in a dynamic environment. With the use of the original source address in the XFF field, the dynamic address groups service 110 can add and remove devices such as the client 1 101 and the client 2 102 from dynamic policy groups. For example, the client 1 101 may be a virtual machine that may be instantiated and shut down as needed in response to network demand. As the client 1 101 comes on and offline, the dynamic address groups service 110 can detect the network traffic from the client 1 101 and update membership of a virtual machines group to add the client 1 101. Additionally, the dynamic address groups service 110 can determine whether any policies which apply to the virtual machines group should be also applied to the traffic from the client 1 101. The dynamic address groups service 110 may also compile repositories of device characteristics which can be queried using the original source address. The device characteristics can include information such as device types, user applied tags ("production server," "storage controller," "image storage," etc.), geographic location, etc. Dynamic groups can be created based on these characteristics. As devices with matching characteristics are discovered, they are automatically added to the defined groups.

The threat intelligence service 111 can utilize the original source address from the XFF field to provide enhanced analysis and identification of threats to the application servers 109 or network. The load balancer's 106 masking of client IP addresses prevents the threat intelligence service 111 from identifying patterns in network traffic, as all the network traffic appears to originate from the load balancer 106. By using the XFF field with the original source address, the threat intelligence service 111 can identify patterns or correlate events based on the original source address. For example, the threat intelligence service 111 can identify that malicious files have been uploaded from a same IP address multiple times, even though the user accounts uploading the file may vary. Prior to having the ability to derive the true source address from the XFF field, the threat intelligence service 111 could only determine the progeny of the malicious files up to the load balancer 106, which is of little value for threat intelligence purposes. By obtaining the original source address from the traffic data 108, the threat intelligence service 111 can analyze and manage threats based on the original source address and additional information derived from the original source address such as usage behavior over time and geo-location.

The policy enforcement service 112 can utilize the original source address from the XFF field to enhance the types of policies which can be created and the enforcement of policies. Because the original source address is available, an administrator can create and enforce policies against that address. For example, if a customer of the application servers 109 has a known IP address or range of IP addresses, policies can be created to allow traffic from those IP addresses. Additionally, having the original source address improves visibility into the characteristics and types of network traffic. For example, policies can be created against characteristics such as country of origin of the traffic, user accounts associated with the original source address, etc.

The logging and application monitoring service 113 allows an administrator to view metrics and logs of network traffic. The logging and application monitoring service 113 processes the traffic data 108, logs the processed data to a file in persistent storage, and displays the data through various user interfaces, such as tables, graphs, etc. The logging and application monitoring service 113 can use the original source addresses from the XFF field in the traffic data 108 during processing and display information about external devices accessing the application servers 109, such as the client 1 101 and the client 2 102. Additionally, the logging and application monitoring service 113 can derive additional information from the original source address which can be used to provide greater visibility into the network traffic. For example, the logging and application monitoring service 113 can derive user account information, geo-location, device type, internet service provider, etc., and can provide an administrator useful information such as how much network traffic is originating from a specific geographic location.

The external dynamic lists service 114 allows for blocking of IP addresses or geographic regions based on subscriptions to external or third-party lists of known security threats. For example, security experts or companies may publish lists of IP addresses known to pose security risks, such as IP addresses of devices that have previously distributed malware. The external dynamic lists service 114 can automatically block traffic based on these external lists by comparing the original source address from the XFF field to addresses on these lists of known security threats.

Figure 2:
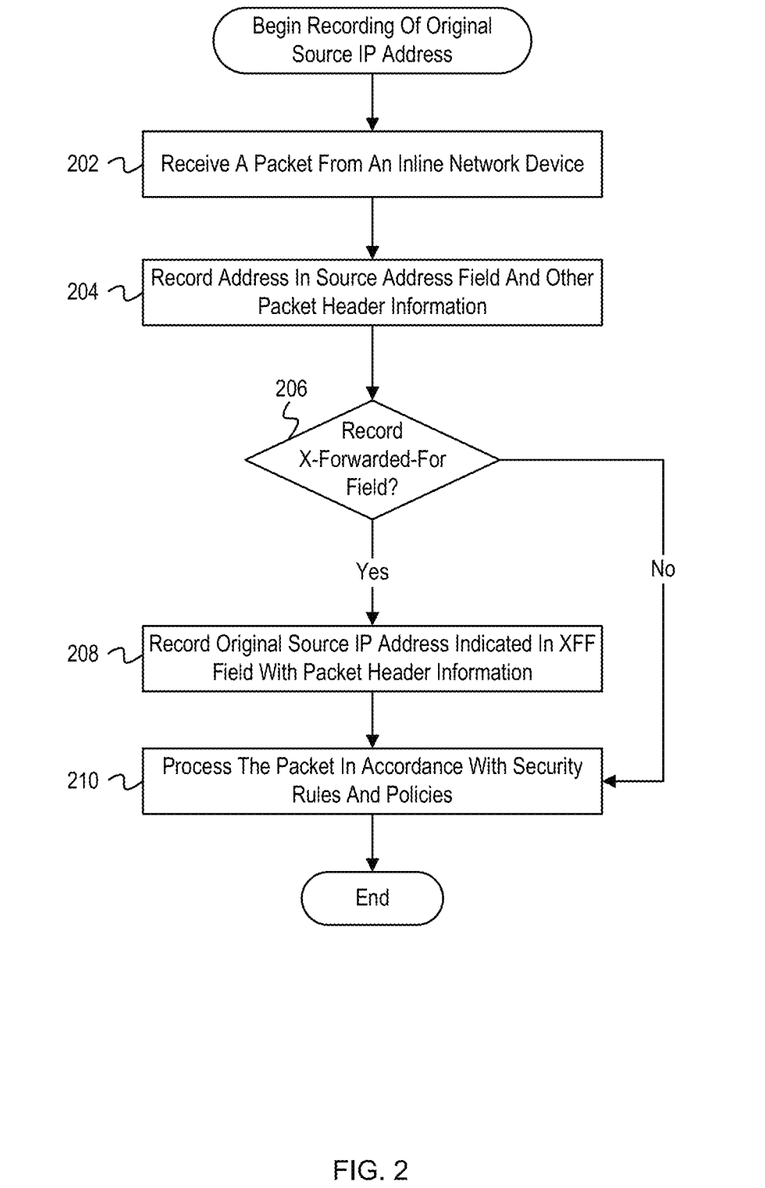
FIG. 2 depicts a flowchart with example operations for recording an original source Internet Protocol address.

FIG. 2 depicts a flowchart with example operations for recording an original source IP address. FIG. 2 refers to a firewall as performing the operations for consistency with FIG. 1, although naming of program code or hardware can vary among implementations.

A firewall receives a packet from an inline network device (202). The firewall may receive the packet from a load balancer, an application gateway, edge router, or other edge network device. In some implementations, the packet may be received from a cloud service or process. The packet may have originated from a client connected over the internet or other wide area network or from within a local area network. After receiving the packet, the firewall begins processing the packet.

The firewall records an address in a source address field and other packet header information (208). The firewall records specified data from the packet header. For example, the firewall may record packet size, source address, destination address, etc.

The firewall determines whether the XFF field should be recorded (204). In some instances, it may be known that the firewall will be placed downstream from a device, such as a load balancer, that will perform NAT or otherwise modify the source address field in the packet header. In these instances, the firewall can be configured at startup or modified/programmed during operation to record data from an XFF field. In some implementations, the firewall can monitor the source address indicated in the source address field, and, if the source address is the same for a threshold number of packets, the firewall can determine that it is downstream from a network device modifying the source address field and begin recording an address or data in the XFF field. In other implementations, the firewall can analyze data in the XFF field, determine whether an IP address is stored in the field, and record the indicated IP address. In still other implementations, the firewall can determine to record the XFF field data based on detecting that it is located inline or downstream from an edge network device such as a load balancer, gateway, proxy, or edge router. The firewall can determine its location in a network based on analyzing a network schematic or topology, pinging connected devices using the simple network management protocol (SNMP), etc.

If the firewall determines that the XFF field should be recorded, the firewall records the original source IP address indicated in the XFF field (206). The firewall writes the original source address from the XFF field to an entry in a network traffic database. The XFF field address may be labeled as an XFF field, as an original source address, or as a source address in place or in addition to an address indicated in the source address field.

After determining that the XFF field should not be recorded or after recording the XFF field, the firewall processes the packet in accordance with security rules and policies (210). The firewall may receive instructions or commands from other services which indicate how to manage the packet. For example, as described in FIG. 3, another service may analyze the original source address and header information to identify any related policies or security threats associated with the address. The service can then send the firewall a command indicating whether the traffic from the address should be blocked or allowed.

Figure 3:
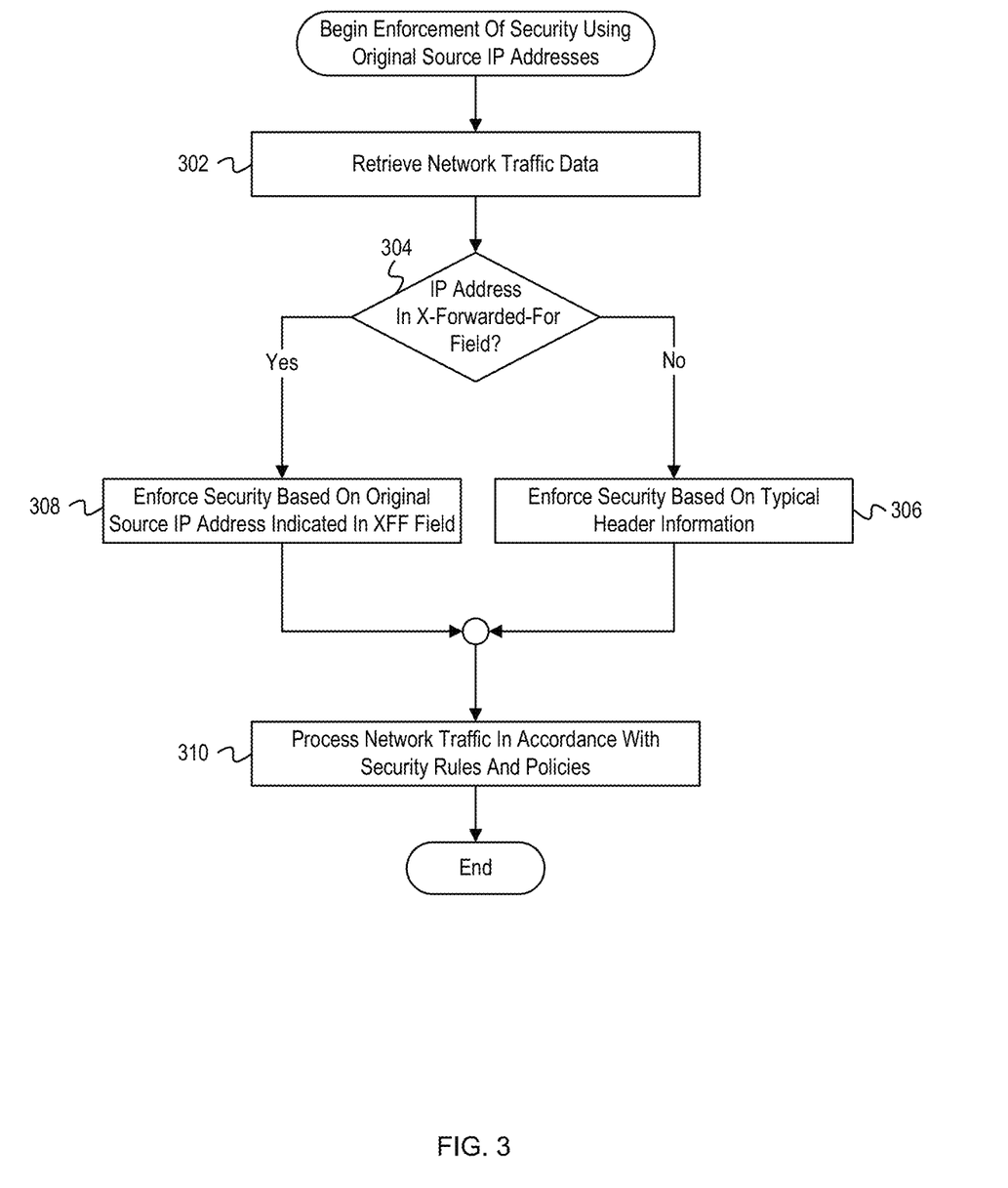
FIG. 3 depicts a flowchart with example operations for enforcing security using an original source IP address.

FIG. 3 depicts a flowchart with example operations for enforcing security using an original source IP address. FIG. 3 refers to a security service as performing the operations, although naming of program code or hardware can vary among implementations.

A security service ("service") retrieves network traffic data (302). The service may be any security or network administration service that polices and monitors network traffic. For example, the service may be any one of the services described in FIG. 1. The service can retrieve network traffic data by querying a database of network traffic data, receiving a batch of new network traffic events from an agent, etc.

The service determines whether there is an IP address indicated in the XFF field (304). The service analyzes the network traffic data to determine whether the data includes a field for XFF data. If there is a field for XFF data, the service determines whether the field includes an IP address. For example, the service may parse the data in the XFF field to determine whether the data matches the structure of an IP address. In some instances, the XFF field may not be populated with an IP address and may instead include other information such as a user account name or session identifier. In those instances, the service determines that the XFF does not include an IP address. In some implementations, the service includes a configurable setting which controls whether the service reads data from the XFF field.

If there is not an IP address indicated in the XFF field, the service enforces security based on typical header information (306). Because the XFF field is not populated with an IP address, the service presumes that the IP address in the source address header field is the address of the device from which the network traffic originated. The service enforces security based on the source address and other recorded, such as destination address, packet size, number of packets, port number, protocol, etc. Enforcing security can include tasks such as identifying applicable policies or rules, logging and analyzing traffic characteristics and behaviors, correlating IP addresses with user accounts, etc. The source address is frequently used in each of these tasks; however, it is possible that the source address is not the true originating address of the network traffic. For example, this may occur in situations where an inline device such as a load balancer has modified the source address field as described in FIG. 1. Since the true source is unknown, the service may not apply the correct policies or rules for securing the network against the traffic identified in the network traffic data. As a result, unsecure network traffic, such as network traffic from restricted geographic regions, could pass through a firewall and gain access to secured resources.

If the service determines an IP address is indicated in the XFF field, the service enforces security based on the original source IP address indicated in the XFF field (308). Because the XFF field is populated with an IP address, the service presumes that the IP address in the XFF field is the original the address of the device from which the network traffic originated. This is in contrast to the operations at block 306 which presume the standard source address header field contains the original IP address. The service enforces security based on the XFF address and other network traffic data, such as an address listed in the source address field, destination address, packet size, number of packets, port number, protocol, etc. Because the true or original source address is known, the service can more effectively identify relevant policies or rules and provide visibility into characteristics and types of network traffic. For example, the service can log the original source address and display how much traffic originated from that address, and the service can search a policies database using the original source address to retrieve relevant policies. Additionally, the service can derive other information from the original source address, such as geo-location or device type, which further enhances the service's capability to identify relevant policies and manage the network traffic. For example, the service can use the geo-location derived from the original source address to identify policies for the corresponding geographic region.

The service processes the network traffic in accordance with determined security rules and policies (310). Based on the policies or rules identified in block 306 or block 308, the service may block the traffic, allow the traffic, throttle the traffic, etc. For example, a policy may indicate that traffic from a particular IP address range should be kept below a 10 megabits/second bandwidth, so the service may begin throttling a user session associated with the original source address. To manage the network traffic, the service may control or send commands to a firewall in the network which received the recorded data. The service may also perform additional processing for network administration or monitoring tasks. For example, the service may implement dynamic address groups and update the group membership to include a device based on the original source address. This can include updating a user interface to display metrics related to the group.

Variations

FIG. 1 is annotated with a series of letters A-C. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

The description above refers to a firewall device as performing logging of traffic data and enforcing network security. However, in some implementations, software or hardware of other devices may be responsible for logging traffic data or enforcing security. For example, the application servers 109 of FIG. 1 may include software for logging network traffic data. Additionally, the application servers 109 can enforce security policies based on other criteria such as user account information associated with specified IP addresses.

The examples often refer to a "service" or "services." The term service is a construct used to refer to implementation of functionality for dynamic policy groups, threat intelligence, policy enforcement, logging and application monitoring, and external dynamic lists. This construct is utilized since numerous implementations are possible. A service may be code running on a firewall or other network device, a virtual machine or container, a particular component or components of a machine (e.g., a particular circuit card enclosed in a housing with other circuit cards/boards), machine-executable program or programs, firmware, a circuit card with circuitry configured and programmed with firmware for recording network traffic data, etc. The term is used to efficiently explain content of the disclosure. The service can also be referred to as a process, application, script, component, device, firewall, enhanced firewall, or next generation firewall. Although the examples refer to operations being performed by a service, different entities can perform different operations.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 204 and 208 of FIG. 2 can be performed in parallel or concurrently. With respect to FIG. 3, block 302 may not be necessary. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electro-magnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 4:
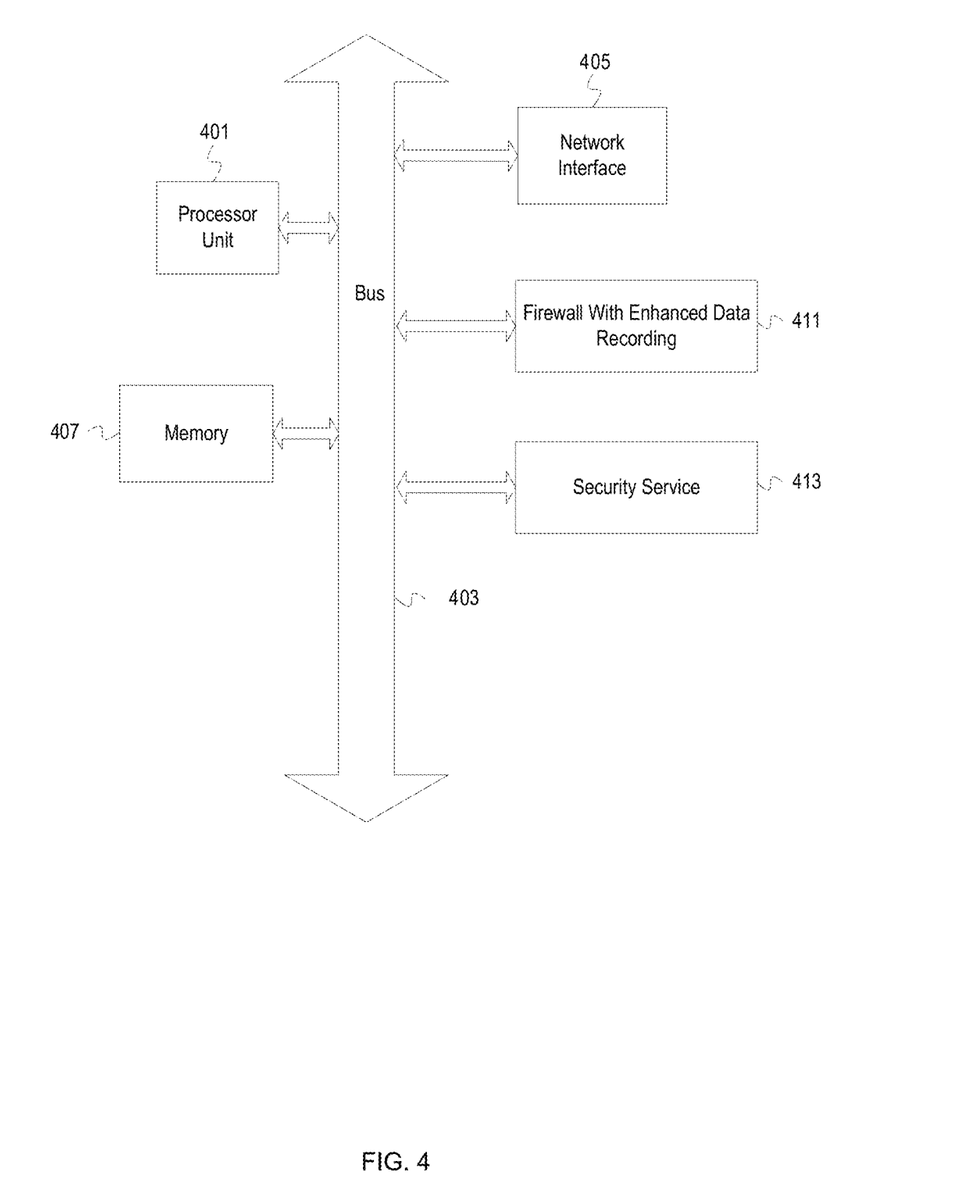
FIG. 4 depicts an example computer system with a firewall with enhanced data recording and a security service.

FIG. 4 depicts an example computer system with a firewall with enhanced data recording and a security service. The computer system includes a processor unit 401 (possibly including multiple processors, multiple cores, multiple nodes, and/or implementing multi-threading, etc.). The computer system includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 403 (e.g., PCI, ISA, PCI-Express, HyperTransport® bus, InfiniBand® bus, NuBus, etc.) and a network interface 405 (e.g., a Fiber Channel interface, an Ethernet interface, an internet small computer system interface, SONET interface, wireless interface, etc.). The system also includes a firewall with enhanced data recording 411 and a security service 413. The firewall with enhanced data recording 411 which optionally records an original source addresses from an XFF field when a source address field in a packet header has been masked or modified by an inline network device. The security service 413 utilizes the recorded XFF data to enforce security based on the original source address. The security service 413 may be one or more of the previously described services such as dynamic address groups, threat intelligence, policy enforcement, logging and application monitoring, and external dynamic lists. Any one of the previously described functionalities may be partially (or entirely) implemented in hardware and/or on the processor unit 401. For example, the functionality may be implemented with an application specific integrated circuit, in logic implemented in the processor unit 401, in a co-processor on a peripheral device or card, etc. Further, realizations may include fewer or additional components not illustrated in FIG. 4 (e.g., video cards, audio cards, additional network interfaces, peripheral devices, etc.). The processor unit 401 and the network interface 405 are coupled to the bus 403. Although illustrated as being coupled to the bus 403, the memory 407 may be coupled to the processor unit 401.

While the aspects of the disclosure are described with reference to various implementations and exploitations, it will be understood that these aspects are illustrative and that the scope of the claims is not limited to them. In general, techniques for recording and enforcing security policies based on an original source address stored in an XFF field as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

This description uses shorthand terms related to cloud technology for efficiency and ease of explanation. When referring to "a cloud," this description is referring to the resources of a cloud service provider. For instance, a cloud can encompass the servers, virtual machines, and storage devices of a cloud service provider. The term "cloud destination" and "cloud source" refer to an entity that has a network address that can be used as an endpoint for a network connection. The entity may be a physical device (e.g., a server) or may be a virtual entity (e.g., virtual server or virtual storage device). In more general terms, a cloud service provider resource accessible to customers is a resource owned/managed by the cloud service provider entity that is accessible via network connections. Often, the access is in accordance with an application programming interface or software development kit provided by the cloud service provider.

This description uses the term "data stream" to refer to a unidirectional stream of data flowing over a data connection between two entities in a session. The entities in the session may be interfaces, services, etc. The elements of the data stream will vary in size and formatting depending upon the entities communicating with the session. Although the data stream elements will be segmented/divided according to the protocol supporting the session, the entities may be handling the data at an operating system perspective and the data stream elements may be data blocks from that operating system perspective. The data stream is a "stream" because a data set (e.g., a volume or directory) is serialized at the source for streaming to a destination. Serialization of the data stream elements allows for reconstruction of the data set. The data stream is characterized as "flowing" over a data connection because the data stream elements are continuously transmitted from the source until completion or an interruption. The data connection over which the data stream flows is a logical construct that represents the endpoints that define the data connection. The endpoints can be represented with logical data structures that can be referred to as interfaces. A session is an abstraction of one or more connections. A session may be, for example, a data connection and a management connection. A management connection is a connection that carries management messages for changing state of services associated with the session.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method comprising:
determining location of a firewall within a network as inline or downstream with respect to an edge network device, wherein determining location of the firewall within the network comprises determining that a first network address is indicated in a source field of a number of packets that exceeds a threshold;
for each of a plurality of packets received by the firewall, updating a database of network traffic data to indicate a first network address from a source address field of the packet;
determining that the packet indicates a second network address in a X-Forward-For (XFF) field;
based on determining that the firewall is inline or downstream from the edge network device and that the packet indicates a second network address in the XFF field of the packet, updating the database to indicate the second network address in association with indication of the XFF field; and
enforcing security on network traffic traversing the firewall based, at least in part, on second source network addresses associated with indication of the XFF field in the database.

2. The method of claim 1, wherein determining location of the firewall within the network comprises one of pinging connected devices with simple network management protocol messages and analyzing a schematic or topology of the network.

3. The method of claim 1 further comprising, for each of the plurality of packets received by the firewall, updating the database to indicate at least one of a network address indicated in a destination field, packet size, port number, and protocol.

4. The method of claim 1 further comprising updating the database to indicate a number of packets received with a same network address in the source address field.

5. The method of claim 1, wherein enforcing security comprises at least one of identifying a policy or rule based on the second network address, logging and analyzing traffic characteristics and behaviors of network traffic by second network addresses, and correlating second network addresses with user accounts, and then processing network traffic accordingly.

6. A non-transitory, computer-readable medium having instructions stored thereon that are executable by a computing device to perform operations comprising:
determining location of a firewall within a network with respect to an edge network device, wherein determining location of the firewall within the network comprises determining that a first network address is indicated in a source field of a number of packets that exceeds a threshold;
for each of a plurality of packets received by the firewall, updating a database of network traffic data to indicate a first network address from a source address field of the packet;
determining whether the packet indicates a second network address in a X-Forward-For field;
based on determining that the location of the firewall is inline or downstream from an edge network device and that the packet indicates a second network address in the XFF field of the packet, updating the database to indicate the second network address in association with indication of the XFF field; and
enforcing security on network traffic traversing the firewall based, at least in part, on second network addresses associated with indication of the XFF field in the database.

7. The non-transitory, computer-readable medium of claim 6, wherein determining location of the firewall within the network comprises one of pinging connected devices with simple network management protocol messages and analyzing a schematic or topology of the network.

8. The non-transitory, computer-readable medium of claim 6 further comprising, for each of the plurality of packets received by the firewall, updating the database to indicate at least one of a network address indicated in a destination field, packet size, port number, and protocol.

9. The non-transitory, computer-readable medium of claim 6 further comprising updating the database to indicate a number of packets received with a same network address in the source address field.

10. The non-transitory, computer-readable medium of claim 6, wherein enforcing security comprises at least one of identifying a policy or rule based on the second network address, logging and analyzing traffic characteristics and behaviors of network traffic by second network addresses, and correlating second network addresses with user accounts, and then processing network traffic accordingly.

11. An apparatus comprising:
a processor; and
a computer-readable medium having instructions stored thereon that are executable by the processor to cause the apparatus to,
determine location of a firewall within a network with respect to an edge network device, wherein the instructions to determine location of the firewall within the network comprise instructions executable by the processor to cause the apparatus to determine that a first network address is indicated in a source field of a number of packets that exceeds a threshold;
for each of a plurality of packets received by the firewall,
update a database of network traffic data to indicate a first network address from a source address field of the packet;
determine whether the packet indicates a second network address in a X-Forward-For field;
based on a determination that the location of the firewall is inline or downstream from an edge network device and a determination that the packet indicates a second network address in the XFF field of the packet, update the database to indicate the second network address in association with indication of the XFF field; and enforce security on network traffic traversing the firewall based, at least in part, on second network addresses associated with indication of the XFF field in the database.

12. The apparatus of claim 11, wherein the instructions to determine location of the firewall within the network comprise instructions executable by the processor to cause the apparatus to one of pinging connected devices with simple network management protocol messages and analyzing a schematic or topology of the network.

13. The apparatus of claim 11, wherein the computer-readable medium further comprises instructions executable by the processor to cause the apparatus to update the database to indicate at least one of a network address indicated in a destination field, packet size, port number, and protocol, for each of the plurality of packets received by the firewall.

14. The apparatus of claim 11, wherein the computer-readable medium further comprises instructions executable by the processor to cause the apparatus to update the database to indicate a number of packets received with a same network address in the source address field.

* * * * *